United States Patent
Yasumoto

(10) Patent No.: US 10,429,689 B2
(45) Date of Patent: Oct. 1, 2019

(54) LIQUID CRYSTAL DISPLAY DEVICE

(71) Applicant: Alpine Electronics, Inc., Tokyo (JP)

(72) Inventor: Takeshi Yasumoto, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 15/840,607

(22) Filed: Dec. 13, 2017

(65) Prior Publication Data

US 2018/0275454 A1 Sep. 27, 2018

(30) Foreign Application Priority Data

Mar. 24, 2017 (JP) .................................. 2017-058370

(51) Int. Cl.
*G02F 1/1335* (2006.01)
*G02F 1/1333* (2006.01)

(52) U.S. Cl.
CPC .. *G02F 1/133512* (2013.01); *G02F 1/133308* (2013.01); *G02F 1/133514* (2013.01); *G02F 2001/133331* (2013.01)

(58) Field of Classification Search
CPC ......... G02F 1/133512; G02F 1/133514; G02F 2001/133331; G02F 1/133388
See application file for complete search history.

(56) References Cited

U.S. PATENT DOCUMENTS

2011/0134378 A1* 6/2011 Tsuboi ............. G02F 1/133512
349/110
2015/0261046 A1* 9/2015 Miki ................. G02F 1/134309
349/42
2015/0355498 A1* 12/2015 Yoshida ........... G02F 1/133308
349/110

FOREIGN PATENT DOCUMENTS

| JP | 2008-209764 A | 2/2007 |
|----|----|----|
| JP | 4660206 | 3/2011 |
| JP | 2016-006515 A | 7/2015 |

* cited by examiner

*Primary Examiner* — Jessica M Merlin
(74) *Attorney, Agent, or Firm* — Brinks Gilson & Lione

(57) ABSTRACT

A liquid crystal display device includes a color filter including a filter portion and a black mask which is arranged around the filter portion and shields light, a liquid crystal panel including a liquid crystal portion including a display region corresponding to the filter portion, and a protection cover which is arranged on a display side of the liquid crystal panel and is made of a translucent material. The protection cover includes an intermediate layer having a pattern in which a partial light shielding region and a partial light transmitting region are mixed corresponding to a part of the black mask arranged outside the filter portion, and a light shielding layer arranged outside the intermediate layer and having the same material and color as the partial light shielding region.

9 Claims, 6 Drawing Sheets

LIQUID CRYSTAL DISPLAY DEVICE

RELATED APPLICATION

The application claims priority to Japanese Patent Application Number 2017-058370, filed Mar. 24, 2017, the entirety of which is hereby incorporated by reference.

BACKGROUND

1. Field

The present disclosure relates to a liquid crystal display device that includes a color filter and displays various kinds of information.

2. Description of the Related Art

In the past, a liquid crystal display device having a structure in which both sides of a liquid crystal display panel in which a display region and a non-display region are arranged with a boundary line L interposed therebetween are interposed between two translucent members formed such that a light shielding layer and a gradation layer are arranged at positions corresponding to the boundary line L to shield light in the non-display region has been known (see, for example, JP 2008-209764 A). Accordingly, it is possible to prevent the boundary line L between the display region and the non-display region having slightly different transmittances from being visually recognized.

Generally, a color filter included in a liquid crystal display device includes a filter portion corresponding to the three primary colors and a black mask portion arranged therearound. Although the filter portion is caused to correspond to the display region, the black mask portion is caused to correspond to the non-display region, and the technique disclosed in JP 2008-209764 A is applied, when the boundary line between the filter portion and the black mask portion is deviated inwardly further than the boundary line between the light shielding layer and the gradation layer due to manufacturing reasons or the like, there is a problem in that the presence of the black mask portion exposed between the filter portion and the light shielding layer becomes noticeable. For example, black or a color close to black is used for each of the light shielding layer and the black mask portion in terms of design, and although the black mask portion is exposed, it is designed not to be noticeable for the light shielding layer, but practically, strictly, the same color is not used in the light shielding layer and the black mask portion due to a difference in a material or the like, and it is difficult to completely prevent the black mask portion from being noticeable.

SUMMARY

The present disclosure was made in light of the foregoing, and it is an object of the present disclosure to provide a liquid crystal display device which is capable of preventing the mask portion around the filter portion included in the color filter from being noticeable.

To solve the problem, a liquid crystal display device of the present disclosure includes: a color filter including a filter portion and a mask portion which is arranged around the filter portion and shields light; a liquid crystal panel including a liquid crystal portion including a display region corresponding to the filter portion; and a cover member which is arranged on a display side of the liquid crystal panel and is made of a translucent material, wherein the cover member includes an intermediate layer having a pattern in which a partial light shielding region and a partial light transmitting region are mixed corresponding to a part of the mask portion arranged outside the filter portion, and a light shielding layer arranged outside the intermediate layer and having the same material and color as the partial light shielding region.

Since the mask portion of the color filter is covered with the intermediate layer having the pattern in which the partial light shielding region and the partial light transmitting region are mixed, and in this intermediate layer, the color of the mask portion of the color filter seen through the partial light transmitting region and the color of the partial light shielding region having the same color as that of the light shielding layer of the cover member are mixedly seen, it is thus possible to prevent the mask portion around the filter portion included in the color filter from being noticeable. Even when the boundary position between the filter portion and the mask portion is deviated inwardly further than the inner boundary of the intermediate layer, and a part of the mask portion is exposed, since the mixed portion is arranged between the light shielding layer and the exposed mask portion, it is possible to prevent only the mask portion from being emphasized and noticeable.

Further, the intermediate layer may extend to the filter portion side beyond the mask portion, and a partial region which comes into contact with the mask portion near an outer circumference of the filter portion is covered with the intermediate layer. Accordingly, it is possible to cause the boundary between the mask portion and the filter portion of the color filter to be blurred, and it is possible to further prevent the mask portion from becoming noticeable.

Further, the partial light shielding region included in the intermediate layer may decrease in the partial region as getting far from the mask portion. Accordingly, it is possible to prevent the boundary between the intermediate layer of the cover member and the filter portion of the color filter from being noticeable while preventing the mask portion of the color filter from being noticeable.

Further, a color of each pixel of the liquid crystal panel corresponding to the partial light transmitting region included in the intermediate layer may be set as an intermediate color between a color of each pixel of the liquid crystal panel adjacent to the intermediate layer and a color of the light shielding layer and/or a color of the mask portion. Accordingly, it is possible to prevent the boundary between the intermediate layer of the cover member and the filter portion of the color filter from being noticeable.

Further, the partial light transmitting region included in the intermediate layer may be formed so that a plurality of colors constituting the filter portion corresponding to one pixel of the liquid crystal panel are exposed at the same ratio. Accordingly, since some color components of each pixel are shielded by the intermediate layer, it is possible to prevent the color of each pixel from being changed.

Further, the pattern may includes the partial light shielding region and the partial light transmitting region which are uniformly mixed. Further, the pattern may be a checkered pattern. Since the intermediate layer has the checkered pattern or the like, and the partial light shielding region and the partial light transmitting region are uniformly mixed, it is possible to cause the entire mask portion seen through the partial light transmitting region to be uniformly blurred when seen from a distance, and it is possible to further prevent the mask portion from being noticeable.

Further, the pattern may include the partial light shielding region and the partial light transmitting region which are mixed in units of pixel units of the liquid crystal panel. Since the partial light shielding region and the partial light trans-

DETAILED DESCRIPTION

Hereinafter, embodiments of a liquid crystal display device to which the present disclosure is applied will be described with reference to the accompanying drawings.

Figure 1:
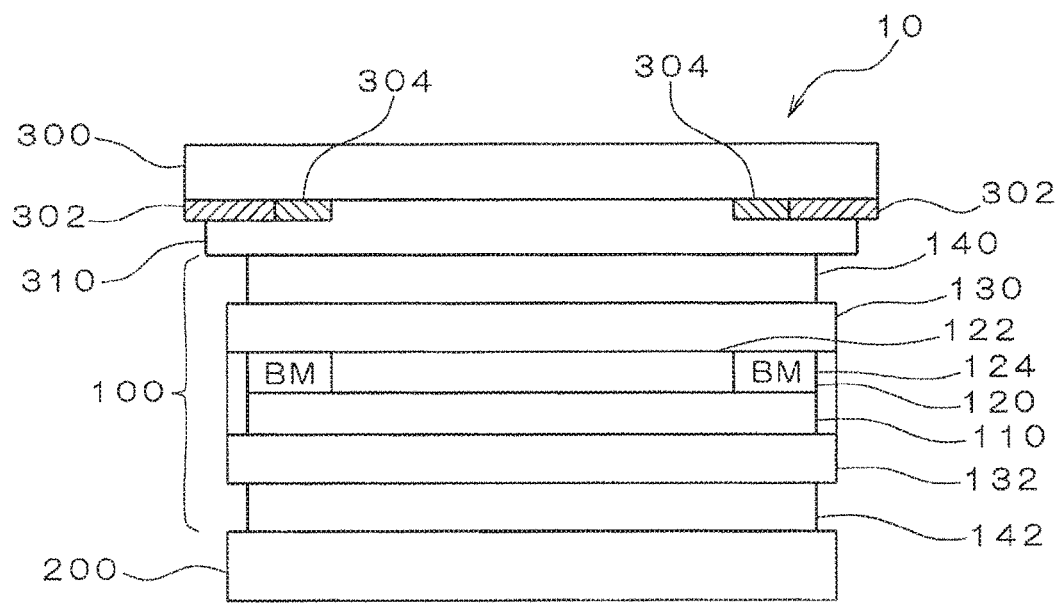
FIG. 1 is a diagram illustrating a configuration of a liquid crystal display device according to a first embodiment.

FIG. 1 is a diagram illustrating a configuration of a liquid crystal display device according to a first embodiment. A liquid crystal display device 10 of the present embodiment includes a liquid crystal panel 100, a backlight 200, and a protection cover 300 as illustrated in FIG. 1.

The liquid crystal panel 100 includes a liquid crystal portion 110, a color filter 120, glass substrates 130 and 132, and polarizing plates 140 and 142.

The liquid crystal portion 110 has a display region in which a liquid crystal material is sealed and a non-display region therearound and is able to control a voltage to be applied such that transmittance (light transmittance) of light of the display region is changed. The color filter 120 includes a filter portion 122 and a black mask (BM) 124. The filter portion 122 has a rectangular shape corresponding to the display region of the liquid crystal portion 110 and has an RGB pattern corresponding to each of a predetermined number of pixels. It is possible to implement an arbitrary color in units of pixels by changing the transmittance of the liquid crystal portion 110 corresponding to these RGB patterns and changing a mixing ratio of RGB. For example, an in plane switching (IPS) (a registered trademark) scheme is used, but other schemes may be used. The black mask 124 is a mask portion arranged around the filter portion 122 and shields light to shield a leading line of a transparent electrode which applies a voltage to the liquid crystal portion 110.

A pair of glass substrates 130 and 132 are arranged with the liquid crystal portion 110 and the color filter 120 interposed therebetween, and a pair of polarizing plates 140 and 142 are arranged with the both sides of the glass substrates 130 and 132 interposed therebetween. One glass substrate 130 constitutes a color filter substrate together with the color filter 120 and the transparent electrode (common electrode) (not illustrated). The other glass substrate 132 constitutes an array substrate together with a TFT circuit (not illustrated) and wirings. Further, transmission axes of the pair of polarizing plates 140 and 142 are orthogonal (90°) to each other.

The backlight 200 is arranged on the back surface of the liquid crystal panel 100, and the protection cover 300 is arranged on the display side. The protection cover 300 is a translucent member composed of acrylic (PMMA), polycarbonate (PC), or glass. The protection covers 300 and one polarizing plate 140 of the liquid crystal panel 100 are bonded through an optical coupling 310 with no optical gap.

Further, a light shielding layer 302 arranged on an outer circumference side to surround a region larger than the filter portion 122 of the color filter 120 and an intermediate layer 304 corresponding to a region between the light shielding layer 302 and the filter portion 122 are formed on the surface (the optical coupling 310 side) of the protection cover 300. The intermediate layer 304 includes a partial light shielding region 304a (FIG. 3) which is made of the same material as the light shielding layer 302 and has the same color (for example, black) as the light shielding layer 302 and a partial light transmitting region 304b (FIG. 3) having a hole shape other than the partial light shielding region 304a. The partial light transmitting region 304b may be configured using a light transmitting member but may be a gap space with nothing. Each of the partial light shielding region 304a and the partial light transmitting region 304b has the same size as each pixel of the liquid crystal panel 100 and is uniformly mixed in units of pixels. Specifically, a checkered pattern is formed by the partial light shielding region 304a and the partial light transmitting region 304b. For example, the light shielding layer 302 and the intermediate layer 304 are simultaneously formed on the surface of the protection cover 300 by printing but may be formed by affixing a film-like portion or the like. Further, the intermediate layer 304 may adopt a pattern other than the checkered pattern.

Figure 2:
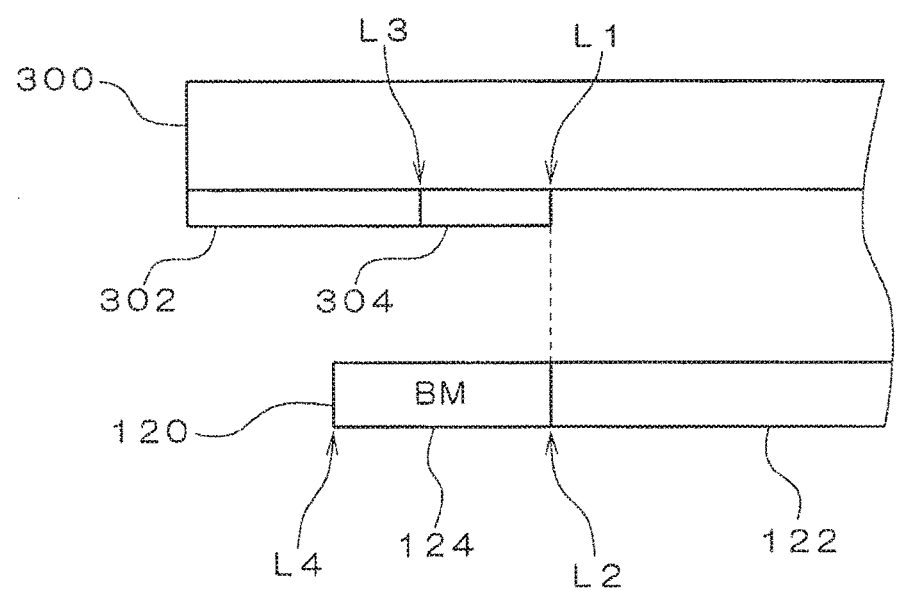
FIG. 2 is a partial cross-sectional view illustrating a positional relationship between an intermediate layer formed on a surface of a protection cover and a filter portion and a black mask of a color filter.
Figure 3:
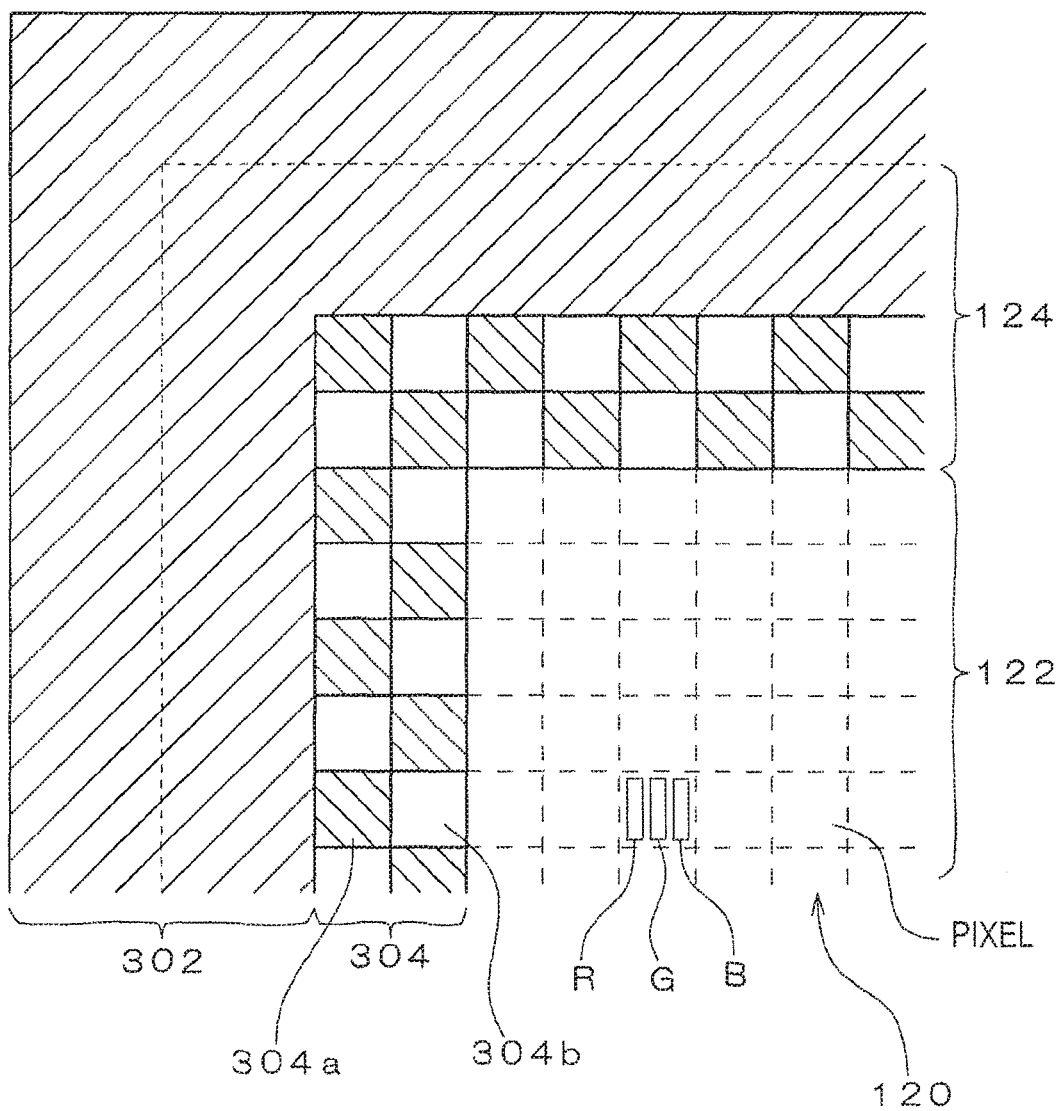
FIG. 3 is a partial plane view illustrating a positional relationship between an intermediate layer formed on a surface of a protection cover and a filter portion and a black mask of a color filter and a specific example of an intermediate layer.

FIG. 2 is a partial cross-sectional view illustrating a positional relationship between the intermediate layer 304 formed on the surface of the protection cover 300 and the filter portion 122 and black mask 124 of the color filter 120. Further, FIG. 3 is a partial plane view illustrating the positional relationship between the intermediate layer 304 formed on the surface of the protection cover 300 and the filter portion 122 and black mask 124 of the color filter 120 and a specific example of the intermediate layer 304.

As illustrated in FIG. 2, an inner boundary L1 of the intermediate layer 304 coincide with a boundary L2 between the filter portion 122 and the black mask 124 of the color filter 120. Further, an outer boundary L3 of the intermediate layer 304 is positioned inwardly further than the outer boundary L4 of the black mask 124. Therefore, as illustrated in FIG. 3, it is possible to see the black mask 124 arranged below the partial light transmitting region 304b of the intermediate layer 304 through the partial light transmitting region 304b of the intermediate layer 304.

As described above, in the liquid crystal display device 10 of the first embodiment, the black mask 124 of the color filter 120 is covered with the intermediate layer 304 having the pattern in which the partial light shielding region 304*a* of the same color and the same color as the light shielding layer 302 and the partial light transmitting region 304*b* are mixed, and the color of the black mask 124 of the color filter 120 visible through the partial light transmitting region 304*b* and the color of the light shielding layer 302 of the protection cover 300 are mixed and uniformly seen in the intermediate layer 304, and thus it is possible to prevent the black mask 124 around the filter portion 122 included in the color filter 120 from being noticeable.

Further, since the intermediate layer 304 has the checkered pattern or the like, and the partial light shielding region 304*a* of the same material and the same color as the light shielding layer 302 and the partial light transmitting region 304*b* are uniformly mixed, it is possible to cause the black mask 124 seen through the partial light transmitting region 304*b* to be uniformly blurred when seen from a distance, and it is possible to further prevent the black mask 124 from being noticeable.

Further, since the partial light shielding region 304*a* and the partial light transmitting region 304*b* are mixed in the intermediate layer 304 in units of pixels, it is possible to cause the intermediate layer 304 to be uniformly seen as a whole and reliably prevent the black mask 124 from being noticeable.

Even when the boundary position L2 between the filter portion 122 and the black mask 124 is deviated inwardly further than the inner boundary L1 of the intermediate layer 304, and a part of the black mask 124 is exposed, since a portion in which the partial light shielding region 304*a* and the partial light transmitting region 304*b* are mixed is arranged between the light shielding layer 302 and the exposed black mask 124, it is possible to prevent only the black mask 124 from being emphasized and noticeable.

Figure 4:
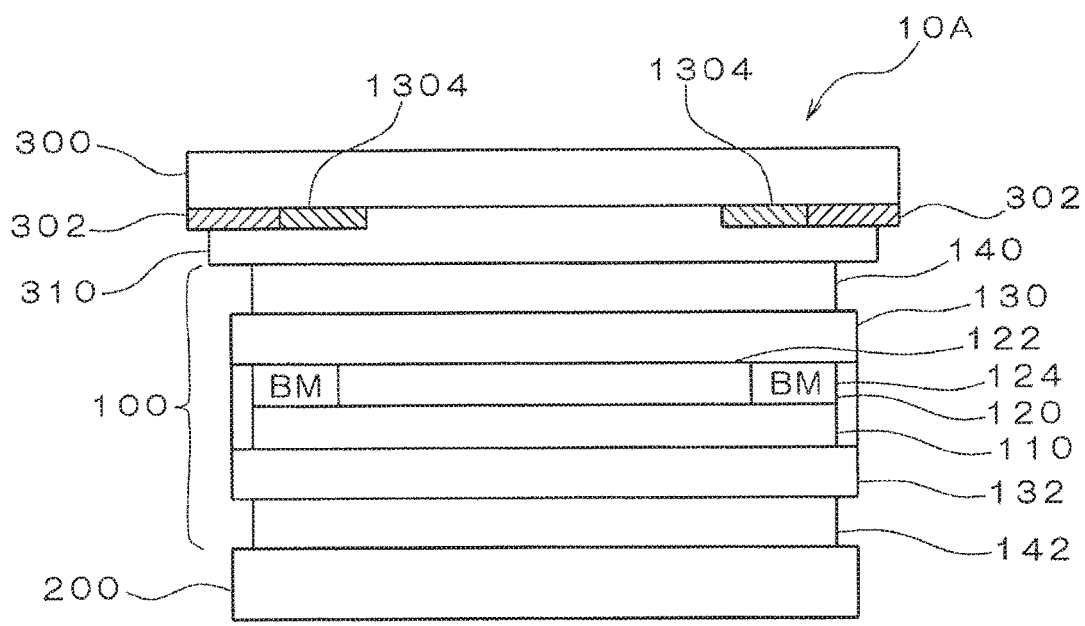
FIG. 4 is a diagram illustrating a configuration of a liquid crystal display device according to a second embodiment.

FIG. 4 is a diagram illustrating a configuration of a liquid crystal display device according to a second embodiment. The liquid crystal display device 10A of the present embodiment illustrated in FIG. 4 differs from the liquid crystal display device 10 of the first embodiment illustrated in FIG. 1 in that the intermediate layer 304 is replaced with an intermediate layer 1304.

The intermediate layer 1304 differs from the intermediate layer 304 of the first embodiment illustrated in FIGS. 1 to 3 in that the inside of the intermediate layer 1304 extends to the filter portion 122 side, for example, by 2 pixels. Accordingly, the black mask 124 and a partial region of the filter portion 122 which comes into contact with the black mask 124 near the outer circumference of the filter portion 122 are covered with the intermediate layer 1304.

Figure 5:
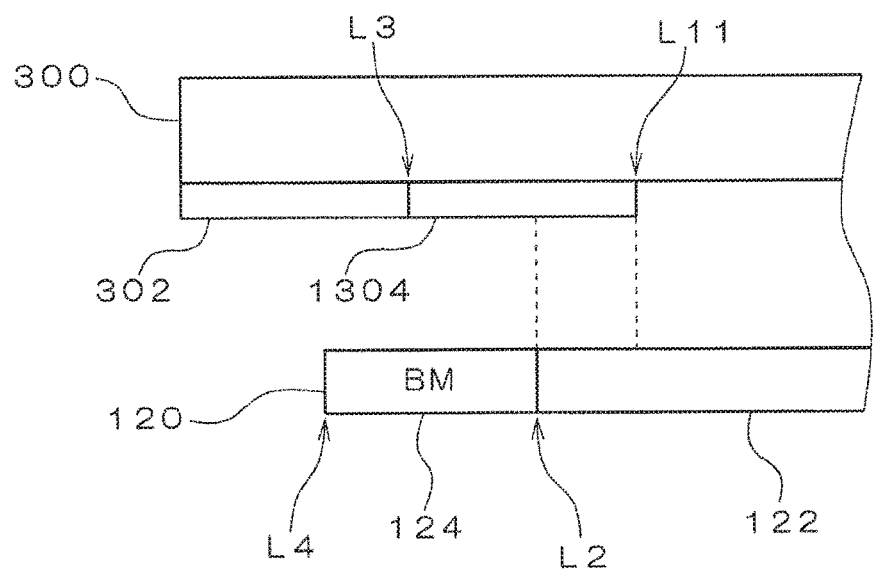
FIG. 5 is a partial cross-sectional view illustrating a positional relationship between an intermediate layer and a filter portion and a black mask according to the second embodiment.
Figure 6:
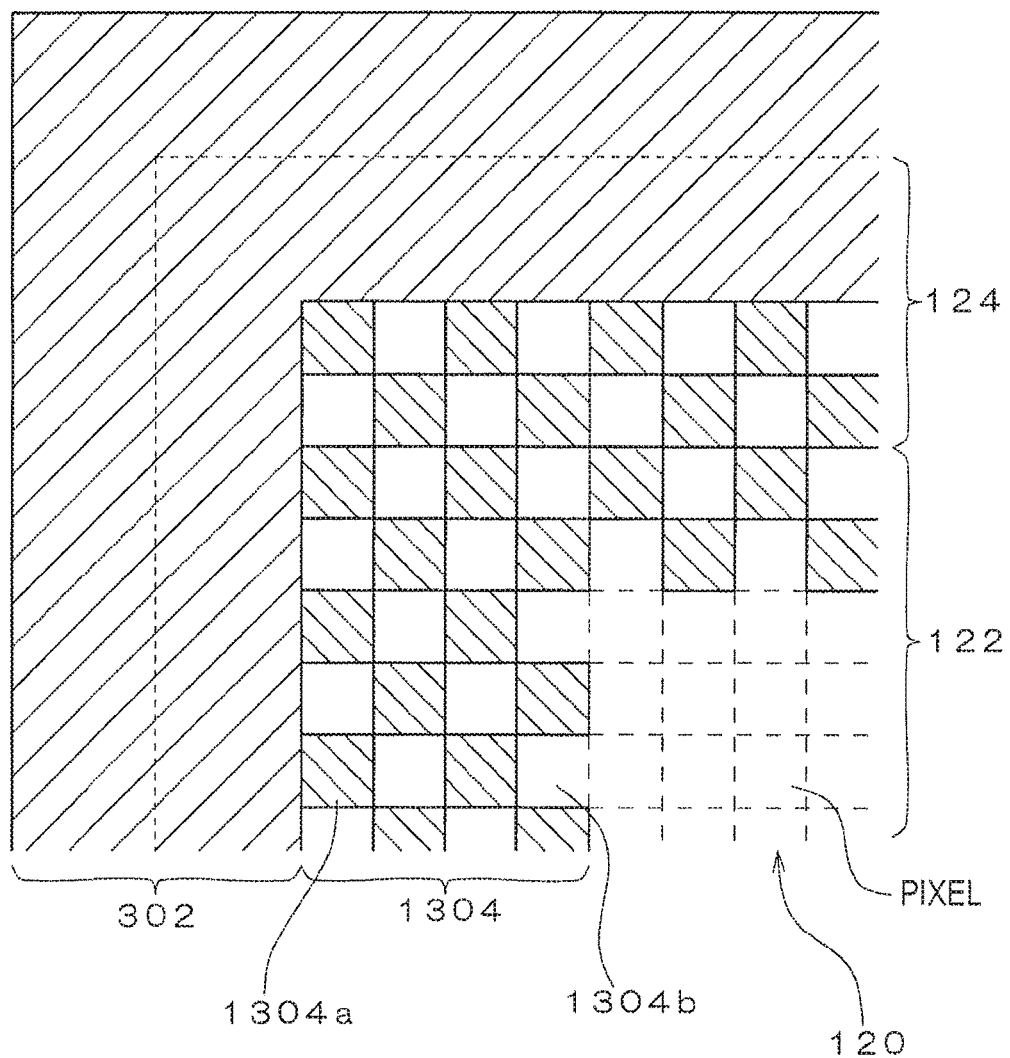
FIG. 6 is a partial plane view illustrating a positional relationship between an intermediate layer and a filter portion and a black mask and a specific example of an intermediate layer according to the second embodiment.

FIG. 5 is a partial cross-sectional view illustrating a positional relationship between the intermediate layer 1304 and the filter portion 122 and the black mask 124 according to the second embodiment. FIG. 6 is a partial plane view illustrating a positional relationship between the intermediate layer 1304 and the filter portion 122 and the black mask 124 and a specific example of the intermediate layer 1304 according to the second embodiment.

As illustrated in FIG. 5, an inner boundary L11 of the intermediate layer 1304 is positioned inwardly further than the boundary L2 between the filter portion 122 and the black mask 124 of the color filter 120. An outer boundary L3 of the intermediate layer 1304 is positioned inwardly further than an outer boundary L4 of the black mask 124. Therefore, as illustrated in FIG. 6, it is possible to see a portion of the black mask 124 and a portion of the filter portion 122 arranged below a partial light transmitting region 1304*b* (portions corresponding to 2 pixels along the outer circumference) through the partial light transmitting region 1304*b* of the intermediate layer 1304.

As described above, in the liquid crystal display device 10A of the second embodiment, the intermediate layer 1304 extends toward the filter portion 122 side beyond the inner boundary L2 of the black mask 124 and covers the partial region along the outer circumference of the filter portion 122. Therefore, it is possible to cause the boundary between the black mask 124 and the filter portion 122 of the color filter 120 to be blurred, and it is possible to further preventing the black mask 124 from being noticeable.

Figure 7:
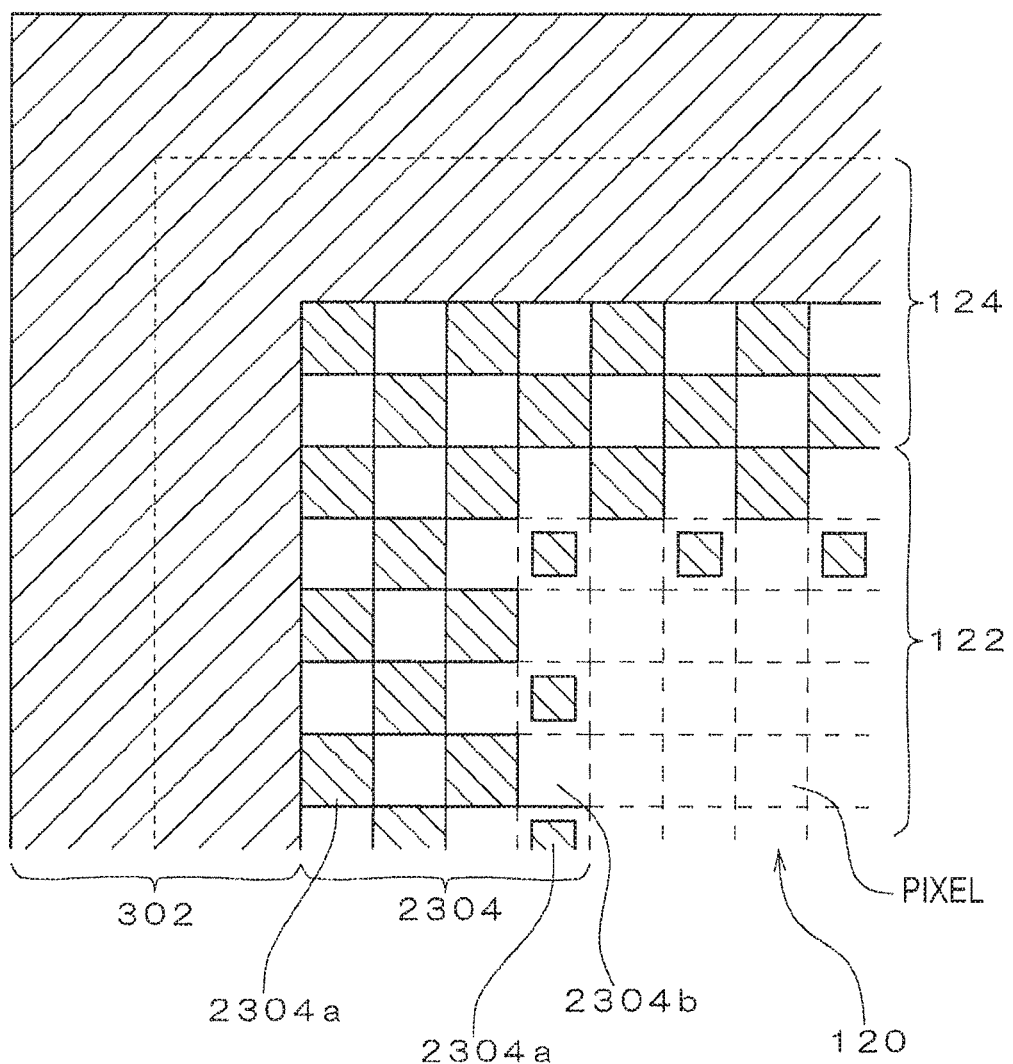
FIG. 7 is a partial plane view illustrating a positional relationship between an intermediate layer and a filter portion and a black mask and a specific example of an intermediate layer according to a third embodiment.

FIG. 7 is a partial plane view illustrating a positional relationship between an intermediate layer 2304 and a filter portion 122 and a black mask 124 and a specific example of the intermediate layer 2304 according to a third embodiment. In a configuration illustrated in FIG. 7, the intermediate layer 1304 of the second embodiment is replaced with an intermediate layer 2304 of the third embodiment, and the remaining configuration can be used without change.

As illustrated in FIG. 7, the intermediate layer 2304 of the present embodiment is similar to the intermediate layer 1304 of the second embodiment in that an inside of intermediate layer 2304 extends toward the filter portion 122 side, for example, by 2 pixels, but a size of a partial light shielding region 2304*a* overlapping the filter portion 122 decreases as getting far inwardly from the black mask 124.

Accordingly, it is possible to prevent the boundary between the intermediate layer 2304 of the protection cover 300 and the filter portion 122 of the color filter 120 from being noticeable while preventing the black mask 124 of the color filter 120 from being noticeable.

In the second embodiment, the color of each pixel seen through the partial light transmitting region 1304*b* of the intermediate layer 1304 covering the filter portion 122 while the liquid crystal display device 10A is operating is not particularly limited, but in the fourth embodiment, the color of each pixel visible through the partial light transmitting region 1304*b* is set to a specific color.

For example, in FIG. 6, the color of each pixel seen from the partial light transmitting region 1304*b* of one pixel width on the inner side adjacent to the black mask 124 is set to the color of the black mask 124, and the color of each pixel seen from the partial light transmitting region 1304*b* of one pixel width on the inner side is set to an intermediate color between the color of the adjacent pixel on the further inner side and the color of the light shielding layer 302 or a partial light shielding region 1304*a*. For example, the setting of the colors is performed by a display processing unit 20 (FIG. 8) which drives the liquid crystal display device 10A.

Figure 8:
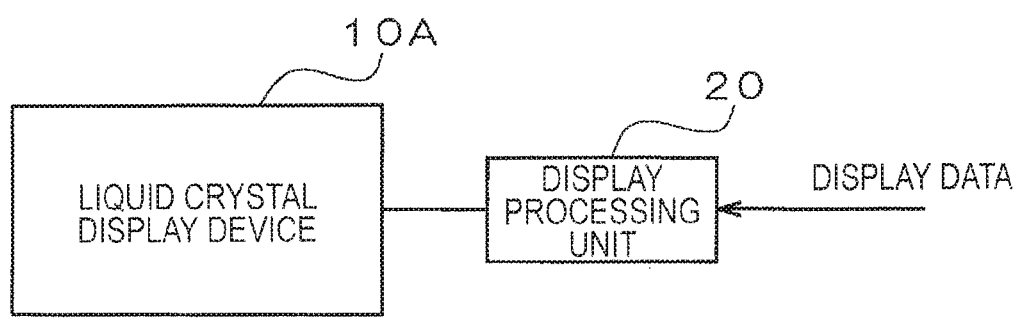
FIG. 8 is a diagram illustrating a configuration of a display system according to a fourth embodiment.

FIG. 8 is a diagram illustrating a configuration of a display system according to the fourth embodiment. The display system illustrated in FIG. 8 includes a liquid crystal display device 10A and a display processing unit 20. For example, the liquid crystal display device 10A has the configuration illustrated in FIG. 4. The display processing unit 20 includes a frame memory to which display data is input and stores RGB data in units of pixels, a color change processing unit that sets the colors of two pixels near the filter portion 122 to an intermediate color between the color of the black mask 124, the color of an adjacent pixel and the color of the light shielding layer 302 or the partial light shielding region 1304*a*, and changes the color of the pixel in the frame memory, and a driver that reads RGB data of pixel units stored in the frame memory and drives the liquid crystal display device 10A.

As described above, since the color of each pixel seen through the partial light transmitting region 1304b is set (changed) to a specific color, it is possible to further prevent the boundary between the intermediate layer 1304 of the protection cover 300 and the filter portion 122 of the color filter 120 from being noticeable.

Meanwhile, the technique of setting the color of each pixel seen through the partial light transmitting region 1304b to a specific color may be applied to the color of each pixel seen through the partial light transmitting region 2304b of the intermediate layer 2304 illustrated in FIG. 7.

Figure 9:
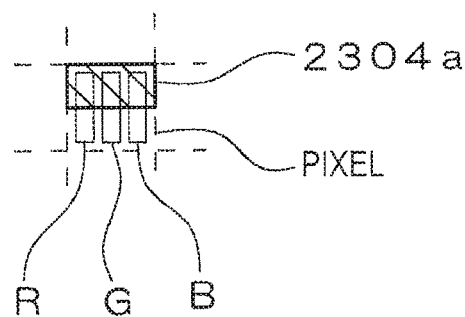
FIG. 9 is a diagram illustrating a modified example of a partial light shielding region.

In the third and fourth embodiments, when the size of the partial light shielding region 2304a is smaller than the size of the partial light transmitting region 2304b, particularly, the size of one pixel illustrated in FIG. 7, for the region exposed without being shielded by the partial light shielding region 2304a within one pixel, the partial light shielding region 2304a preferably has a shape in which a plurality of colors (R, G, and B) constituting the filter portion 122 in one pixel are exposed with the same ratio as illustrated in FIG. 9 instead of the rectangular shape (square) similar to the pixel. Accordingly, since a part of each pixel is covered with the partial light shielding region 2304a of the intermediate layer 2304, it is possible to prevent a situation in which the ratio of the exposed RGB is changed, and the color of each pixel is changed.

The present disclosure is not limited to the above embodiments, and various modifications can be made within the scope of the present disclosure. For example, in the fourth embodiment, the color of each pixel seen from the partial light transmitting region 1304b of one pixel width on the inner side adjacent to the black mask 124 is set to the color (first color) of the black mask 124, and the color of each pixel seen from the partial light transmitting region 1304b of one pixel width on the inner side is set to an intermediate color (second color) between the color of the adjacent pixel on the further inner side and the color of the light shielding layer 302 or a partial light shielding region 1304a, but both the first and second colors may be replaced with the first color or the second color.

As described above, according to the present disclosure, since the mask portion of the color filter is covered with the intermediate layer having the pattern in which the partial light shielding region and the partial light transmitting region are mixed, and in this intermediate layer, the color of the mask portion of the color filter seen through the partial light transmitting region and the color of the partial light shielding region having the same color as that of the light shielding layer of the cover member are mixedly seen in the intermediate layer, it is thus possible to prevent the mask portion around the filter portion included in the color filter from being noticeable.

What is claimed is:

1. A liquid crystal display device, comprising:
a color filter including a filter portion and a mask portion which is arranged around the filter portion and shields light;
a liquid crystal panel including a liquid crystal portion including a display region corresponding to the filter portion; and,
a cover member which is arranged on a display side of the liquid crystal panel and is made of a translucent material;
wherein the cover member includes:
an intermediate layer having a pattern in which a partial light shielding region and a partial light transmitting region are mixed, and corresponding to a part of the mask portion arranged outside the filter portion; and,
a light shielding layer arranged outside the intermediate layer and having the same material and color as the partial light shielding region; and,
wherein a color of each pixel of the liquid crystal panel corresponding to the partial light transmitting region included in the intermediate layer is set as an intermediate color between a color of the mask portion and a color of a pixel of the liquid crystal panel adjacent to each pixel.

2. The liquid crystal display device according to claim 1, wherein the intermediate layer extends to the filter portion side beyond the mask portion, and a partial region which comes into contact with the mask portion near an outer circumference of the filter portion is covered with the intermediate layer.

3. The liquid crystal display device according to claim 2, wherein the partial light shielding region included in the intermediate layer decreases in the partial region as getting far from the mask portion.

4. The liquid crystal display device according to claim 2, wherein the partial light transmitting region included in the intermediate layer is formed so that a plurality of colors constituting the filter portion corresponding to one pixel of the liquid crystal panel are exposed by the intermediate layer at the same ratio.

5. The liquid crystal display device according to claim 1, wherein the pattern includes the partial light shielding region and the partial light transmitting region which are uniformly mixed.

6. The liquid crystal display device according to claim 1, wherein the pattern is a checkered pattern.

7. The liquid crystal display device according to claim 1, wherein the pattern includes the partial light shielding region and the partial light transmitting region which are mixed in units of pixel units of the liquid crystal panel.

8. A liquid crystal display device, comprising:
a color filter including a filter portion and a mask portion which is arranged around the filter portion and shields light;
a liquid crystal panel including a liquid crystal portion including a display region corresponding to the filter portion; and,
a cover member which is arranged on a display side of the liquid crystal panel and is made of a translucent material;
wherein the cover member includes:
an intermediate layer having a pattern in which a partial light shielding region and a partial light transmitting region are mixed, and corresponding to a part of the mask portion arranged outside the filter portion; and,
a light shielding layer arranged outside the intermediate layer and having the same material and color as the partial light shielding region; and,
wherein a color of each pixel of the liquid crystal panel corresponding to the partial light transmitting region included in the intermediate layer is set as an intermediate color of a color of the light shielding layer and a color of a pixel adjacent to each pixel.

9. A liquid crystal display device, comprising:
a color filter including a filter portion and a mask portion which is arranged around the filter portion and shields light;

a liquid crystal panel including a liquid crystal portion including a display region corresponding to the filter portion; and,
a cover member which is arranged on a display side of the liquid crystal panel and is made of a translucent material;
wherein the cover member includes:
   an intermediate layer having a pattern in which a partial light shielding region and a partial light transmitting region are mixed, and corresponding to a part of the mask portion arranged outside the filter portion; and,
   a light shielding layer arranged outside the intermediate layer and having the same material and color as the partial light shielding region; and,
wherein the partial light transmitting region included in the intermediate layer is formed so that a plurality of colors constituting the filter portion corresponding to one pixel of the liquid crystal panel are exposed by the intermediate layer at the same ratio.

* * * * *